(12) United States Patent
Rinaldi

(10) Patent No.: US 6,410,876 B1
(45) Date of Patent: Jun. 25, 2002

(54) METHOD FOR ORBITAL WELDING OF SMALL-, MEDIUM-, AND LARGE-DIAMETER PIPES

(75) Inventor: Fernando Rinaldi, Guardamiglio (IT)

(73) Assignee: P.W.T. S.p.A., Milan (IT)

( * ) Notice: Subject to any disclaimer, the term of this patent is extended or adjusted under 35 U.S.C. 154(b) by 0 days.

(21) Appl. No.: 09/541,073

(22) Filed: Mar. 31, 2000

(30) Foreign Application Priority Data

Apr. 2, 1999 (IT) ......................................... TO99A0258

(51) Int. Cl.$^7$ ............................................... B23K 31/02
(52) U.S. Cl. ....................................................... 219/61
(58) Field of Search ........................ 219/61, 59.1, 60 R

(56) References Cited

U.S. PATENT DOCUMENTS

| | | | | |
|---|---|---|---|---|
| 3,084,246 A | * | 4/1963 | Rieppel et al. | 219/124.21 |
| 3,374,335 A | * | 3/1968 | Reesor et al. | 219/137 R |
| 3,668,360 A | * | 6/1972 | Ballis | 219/61 |
| 4,065,846 A | * | 1/1978 | Leonard, Jr. | 29/407 |
| 4,142,085 A | * | 2/1979 | Knipstrom et al. | 219/126 |
| 4,145,594 A | * | 3/1979 | Koshiga et al. | 219/61 |
| 4,255,641 A | * | 3/1981 | Connell et al. | 219/61 |
| 4,283,617 A | * | 8/1981 | Merrick et al. | 219/125.1 |
| 4,320,277 A | * | 3/1982 | Taira et al. | 219/61 |
| 4,373,125 A | | 2/1983 | Kazlauskas | |
| 5,030,812 A | * | 7/1991 | Sugitani et al. | 219/124.34 |
| 5,440,090 A | * | 8/1995 | Davis et al. | 219/61 |
| 5,440,109 A | * | 8/1995 | Ikeda et al. | 219/130.5 |

FOREIGN PATENT DOCUMENTS

EP 0 402 648 12/1990

* cited by examiner

*Primary Examiner*—Tom Dunn
*Assistant Examiner*—Zidia Pittman
(74) *Attorney, Agent, or Firm*—Guido Modiano; Albert Josif; Daniel O'Byrne

(57) ABSTRACT

The method comprises a first-run weld performed from the outside without pads for backing the weld pool, which is obtained by: preparing a welding bevel (C) having a closed bottom by arranging, so that they are mutually adjacent, two pipe segments (T–T') having symmetrical welding bevel half-profiles (p–p') with respective annular abutment surfaces (sp–sp') which are meant to form, by arranging them mutually adjacent so as to obtain front contact, the closed bottom of the welding bevel (C), the closed bottom being further delimited by a groove (SV) which has a maximum chord of preset width (H); performing the first welding run with one or more welding torches which are supplied with a welding wire whose diameter "d" is dependent on the maximum chord (H) of the bottom groove (SV) of the welding bevel (C); maintaining, during the first welding run, the welding arc at a controlled length, by relating the distance (h) between the end of the welding wire and the vertex of the bottom groove (SV) the width of the maximum chord (H) of the groove.

7 Claims, 2 Drawing Sheets

METHOD FOR ORBITAL WELDING OF SMALL-, MEDIUM-, AND LARGE-DIAMETER PIPES

BACKGROUND OF THE INVENTION

The present invention relates to methods for orbital welding of small-, medium- and large-diameter pipes, particularly pipes for oil pipelines, gas pipelines and pressurized ducting in general.

More specifically, the invention relates to the improved execution of the first run, or root run, in said orbital welding methods.

It is well-known to the skilled in the art that pipelines made of small-, medium- and large-diameter pipes are laid by forming the pipeline with on-site welding of successive pipe segments which are gradually juxtaposed, welded one another, wrapped and optionally buried or submerged. Welding is performed in successive runs by carriages provided with one or more welding torches, which orbit around the pipe and are guided by a fixed rail, which surrounds the end of the final portion of pipe to which it is rigidly coupled in each instance; said rail is provided with a lateral rack with which a driving pinion meshes in order to move the carriage at a feed rate Vx which coincides with the welding rate.

The heads of the pipe segments to be joined are first machined in order to form thereon profiles or chamfers which, after the pipes have been mated, form a welding bevel on whose shape various welding parameters and the welding method depend very critically.

Typically, said welding parameters are constituted by said rate Vx with which the carriage that orbits on the respective guiding rail travels, by the rate Vf at which the welding wire is fed to the respective welding torch and on the welding voltage V. These parameters vary during the welding process, as better described hereinafter, in particular according to the angular position of the carriage with respect to the pipe, due to the action of gravity on the weld pool, and therefore according to the variation in penetration to the base of the welding bevel.

Moreover, correct execution of the so-called first run or root run or beading depends not only on the adjustment of the welding parameters but also on the nature and configuration of the bottom of the welding bevel.

By resorting to an orbital automatic method, in order to obtain first-run welding beads which are substantially free from discontinuities both towards the outside and towards the inside of the pipe and with medium-high welding rates, which are adequate from the production viewpoint, welding bevels are conventionally provided having a closed or open bottom. In the latter variant a gap of approximately 1.5 mm is left between the heads of the juxtaposed pipes. In any case the first-run weld pool is backed on the side opposite to the one on which the welding is performed by using expanding pads which are supported by a coupling element and are arranged adjacent to the internal surface of the pipes in order to affect and back the weld pool.

A so-called backing run is also conventionally performed inside said is pipes by using special welding and coupling means.

More specifically, conventional methods for performing first-run welding are substantially as follows: first conventional method: performing the first run or beading from the outside, providing open or closed welding bevels and using means for the internal backing of the weld pool; second conventional method: performing the first run or beading from the outside, preparing open welding bevels but without any backing of the weld pool; third conventional method: execution of a so-called backing internal run.

The first method substantially uses pads of two different types: metallic pads and pads made of inert material. The former, typically made of copper, contribute, due to their high heat conductivity, to rapidly dissipate the heat and therefore to rapidly solidify the weld pool, allowing corresponding high run rates, typically between 60 and 95 cm/minute. However, they suffer the drawback that they contaminate, often unacceptably, the weld pool with percentages of copper that the welding arc strips from the surface of the underlying pad, involving it in the welding process. These percentages, albeit small, generate, together with the metal of the weld pool, several alloys which have a discontinuous microcrystalline structure which is characterized by the presence of a microcapillary and intergranular inclusion of the copper, and of microfractures caused by non-uniform shrinkage of the metal during cooling.

Accordingly, the first-run welding bead is not fully satisfactory both from the point of view of mechanical strength and from the point of view of surface continuity, distribution uniformity and resistance to any corrosive elements and agents.

Pads made of inert material, typically ceramic material, eliminate the drawback of weld pool contamination, but at the price of a drastic reduction in the rate of the first run, which drops to approximately 35–45 cm/minute. This occurs because of the low thermal conductivity of ceramic material, which is unable to rapidly dissipate the heat of the weld pool and accelerate its solidification. Moreover, if continuity of the process is not provided, the welding arc tends to directly strike the surface of the pads and to form small surface pitting thereon; accordingly, said pads wear rapidly and require frequent maintenance and replacement.

The second conventional method for performing the first welding run, which uses open-bottom welding bevels with a gap of approximately 1.5 mm but with absolutely no weld pool backing means, has a high risk of discontinuity and unevenness of the run, with conspicuous defects caused by excessive penetration, holes, or incomplete penetration and other considerable typical defects which cannot be fully eliminated and are entirely unacceptable. Moreover, this method entails a very low run rate of no more than 25–35 cm/minute, with a consequently extremely low operating productivity.

Moreover, according to this method the gap between the heads of the juxtaposed pipes, determined during the optimization of the parameters of the welding process, is by far the most important factor in the correct execution of the first-run weld. The tolerance of this parameter is very limited, since the correct penetration of the arc and of the weld pool depends on it. This is another drawback and a considerable limitation of this method, since regardless of the coupling means used to support the pipes in a mutually juxtaposed arrangement it is extremely difficult, during the welding operations, to contain said gap within the set tolerances, both due to the likely mutual movements of the coupled pipes and due to the thermal shrinkage of said pipes during welding. Accordingly, this method has not been as successful as hoped and in particular shows its limitations in the welding arc between 0 and 45°, where excessive penetration, with holes, pits and droplets is often noted; in the subsequent angular positions between 45 and 135°, phenomena related to lack of penetration are instead more frequent, and the region between 135 and 180° always exhibits conspicuous sagging due to the action of gravity on the molten material, in addition to the holes caused by excessive penetration.

The third conventional method was developed with the goal of obviating the typical drawbacks of both of the preceding types of pad used to back the weld pool in the method of the first kind and at the same time with the goal of maintaining high execution rates for the first-run weld. For this purpose, as mentioned earlier, according to said third conventional method a light run for backing the weld pool is performed inside the pipe by means of welding torches applied to the coupling element.

This method of execution does indeed achieve high welding rates of 90 to 120 cm/minute, but it has not yielded the expected results both in economic terms and in technical terms, since it requires the use of extremely complicated and expensive coupling elements equipped with welding torches with movable torch holders provided with all the means adapted to allow them to orbit on the internal surface of the pipe under external control. Moreover, with such a system, since it is impossible to work proximate to welding area and therefore monitor the welding operations during their execution, it is absolutely indispensable to perform, before each run, perfect fine-tuning and painstaking maintenance of the welding elements, in order to avoid errors in operation and consequent welding defects. Moreover, in case of faulty operation, it is absolutely necessary to remove the coupling unit from the working position and to work inside the pipe with a manual welding process in order to repair or restore, before performing the subsequent runs, the incomplete or defective internal first-run bead. These operations are anything but rare and slow productivity to a significant extent, thus eliminating the advantage arising from the rate of execution of the first run.

SUMMARY OF THE INVENTION

The aim of the present invention, starting from the notion of the above noted drawbacks, is to eliminate said drawbacks, and within the scope of this general aim the present invention has the important and particular object of providing an improved orbital welding method in which the first-run weld is performed from the outside of the pipe with a closed welding bevel but without any backing of the weld pool and at a substantial rate which is in any case higher than 45 cm/minute.

This renders no more necessary the metallic and ceramic backing pads; moreover, on the one hand the run rate is kept high although contaminating metallic traces are entirely absent in the weld pool, and on the other hand it is possible to use standard internal coupling elements which are functionally and structurally conventional, are simple and inexpensive to manufacture and are not only devoid of the pads and of the corresponding movement elements but are likewise free of movable supporting means for welding torches orbiting inside the pipe, with the corresponding control elements.

Another important object of the present invention is to provide a method for first-run orbital welding without backing in which the mutual arrangement of the pipe segments is significantly facilitated by the elimination of the bottom gap of the welding bevel. It is therefore possible to arrange said segments in abutment against each other.

According to the present invention, this aim, these objects and others which will become apparent hereinafter, are achieved with an improved orbital welding method which has the specific characteristics stated in the appended claims.

Substantially, the invention is based on the concept of providing symmetrical half-welding bevel profiles at the juxtaposed ends of the pipe segments to be welded, said profiles having respective flat abutment surfaces adapted to be mutually engaged by front contact in order to form a closed-bottom welding bevel when said pipe segments are mated.

Moreover, according to the invention the closed bottom of the welding bevel is delimited by two inclined straight chamfers which form a bottom groove having a substantially triangular profile whose vertex lies at the abutment plane of said surfaces and which blends, by means of circular arcs, is with the respective front walls of the welding bevel. In such a welding bevel, the first-run weld is performed from the outside and without means for backing the weld pool by means of a welding wire whose diameter is 25–5% smaller than the maximum chord of said bottom groove, and with a welding arc which is adjusted so that it is 300–1000% longer than said maximum groove chord.

As will become apparent from the following description, by proceeding as specified above, the microstructural welding, by melting, of the flat surfaces that are in mutual abutment contact, is obtained, with a welding depth, on each pipe segment, substantially equal to 350÷450% of the maximum chord of the bottom groove; said welding by melting is complemented by the formation of a first-run bead of added material which substantially has, in transverse cross-section, the profile of the bottom groove of the welding bevel and of part of the arcs for blending with the two front walls.

BRIEF DESCRIPTION OF THE DRAWINGS

The characteristics, purposes and advantages of the improved welding method according to the present invention will become apparent from the following detailed description and with reference to the accompanying drawings given by way of non-limitative example and wherein.

DESCRIPTION OF THE PREFERRED EMBODIMENTS

Figure 1:
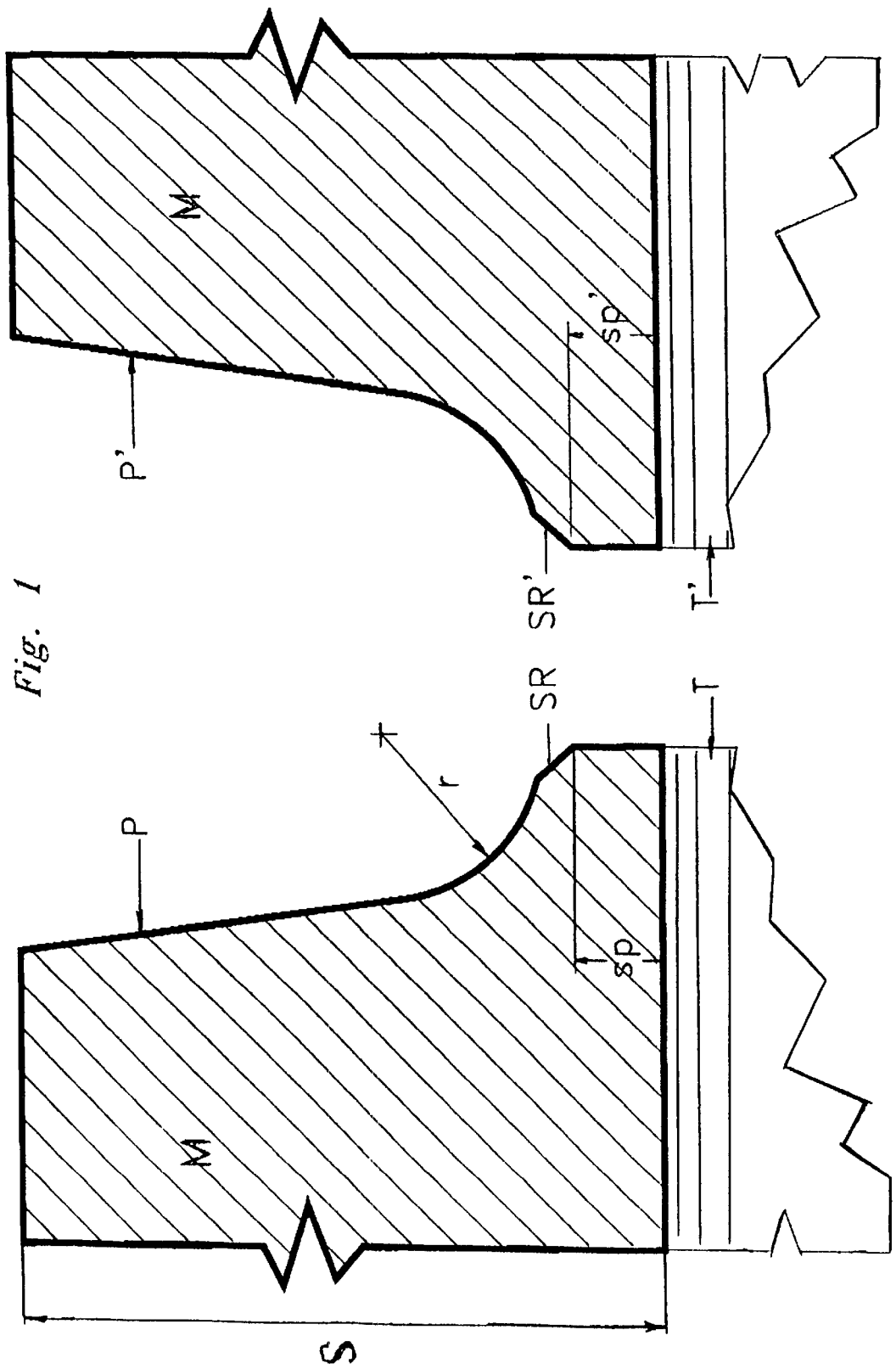
FIG. 1 is a partial sectional view, taken along an axial plane, of the heads of two pipe segments with the respective half-welding bevel profiles according to the invention.

With reference to FIG. 1, T and T' designate two steel pipe segments which have the same inside and outside diameters and therefore have the same thickness S of the cylindrical wall M; said pipes are arranged so that one extends the other and are adapted to be mutually welded in order to form the pipeline under construction.

The juxtaposed heads of each pipe segment T–T' are machined so as to have half-welding bevel profiles p–p' symmetrical with respect to the abutment and joining plane G and adapted to form, when said tube segments are mutually adjacent as shown in the figure, a welding bevel C for accommodating the subsequent welding runs.

According to the invention, the half-welding bevel profiles p–p' have respective annular flat abutment surfaces sp–sp' adapted to be moved into mutual front contact engagement in order to define a closed bottom for the welding bevel C. Said closed bottom is delimited by two inclined straight chamfers SR–SR' which define a bottom groove SV having a substantially triangular profile and whose vertex lies at said abutment plane G and has a maximum chord H which stretches between the two diverging ends of the straight chamfers SR–SR'.

Said chamfers are blended with the front walls P–P' of the welding bevel C by means of circular arcs having a radius r (FIG. 1).

The method according to the present invention provides, for performing the first-run weld, the following operating steps:

preparing the welding bevel C having a closed bottom by arranging, so that they are mutually adjacent, two segments T–T' with symmetrical half-profiles p–p' which are juxtaposed in mutual contact engagement at the respective annular abutment surfaces sp–sp', whose thickness s=s' is 25÷35% greater than the maximum chord H of the bottom groove SV, where:

$$s=s'=1.25 \div 1.35H,$$

using one or more welding torches which are supplied with a welding wire Fs whose diameter "d" is 25÷5% smaller than the length of the maximum chord, H of the bottom groove SV; where d=0.75÷0.95 H, forming a welding arc of controlled length, limiting the distance h between the end of the welding wire Fs and the vertex of said bottom groove SV to a value between 300 and 1000% of the length of said maximum chord; where h=3÷10 H.

Figure 3:
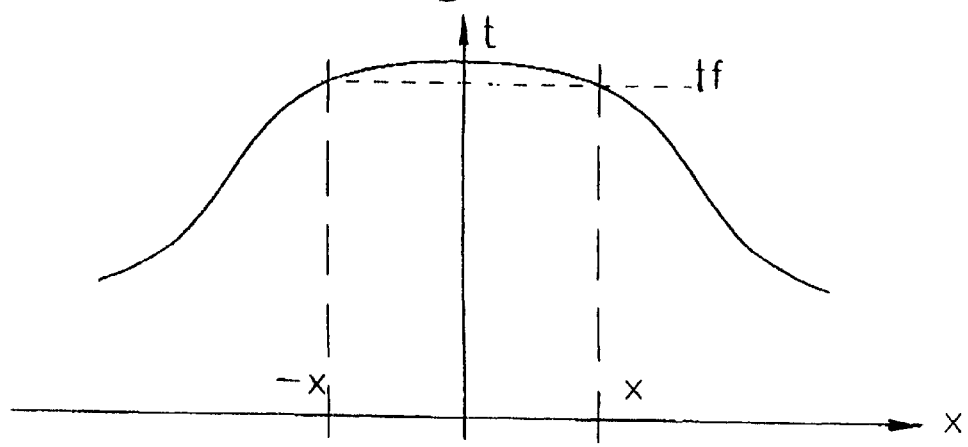
FIG. 3 is a chart which plots the temperature produced by the welding arc in the metal of the tube segments at the abutment surfaces that delimit the closed bottom of the welding bevel of FIG. 2.

By proceeding with the above conditions, the distribution of the temperature generated by the welding arc in the material of the heads of the juxtaposed pipes T–T' is plotted as shown in the chart of FIG. 3, where tf is the melting temperature of the metal of the pipes and x is the penetration of the temperature in the direction parallel to the axis of said pipes.

This chart shows that the penetration of the welds extends to the region adjacent to the juxtaposed surfaces sp–sp' and into both segments T–T' by an extent x; –x, each being substantially equal to 350÷450% of the width of the chord H of the bottom groove. Accordingly, microstructural welding by melting of the juxtaposed surfaces sp and sp' of the pipe segments involved in the welding process, with a penetration x=3.5÷4.5 H, is achieved.

For correct control of welding penetration, it is advantageous to cool the welding torch or torches by means of a coolant, typically water.

Figure 2:
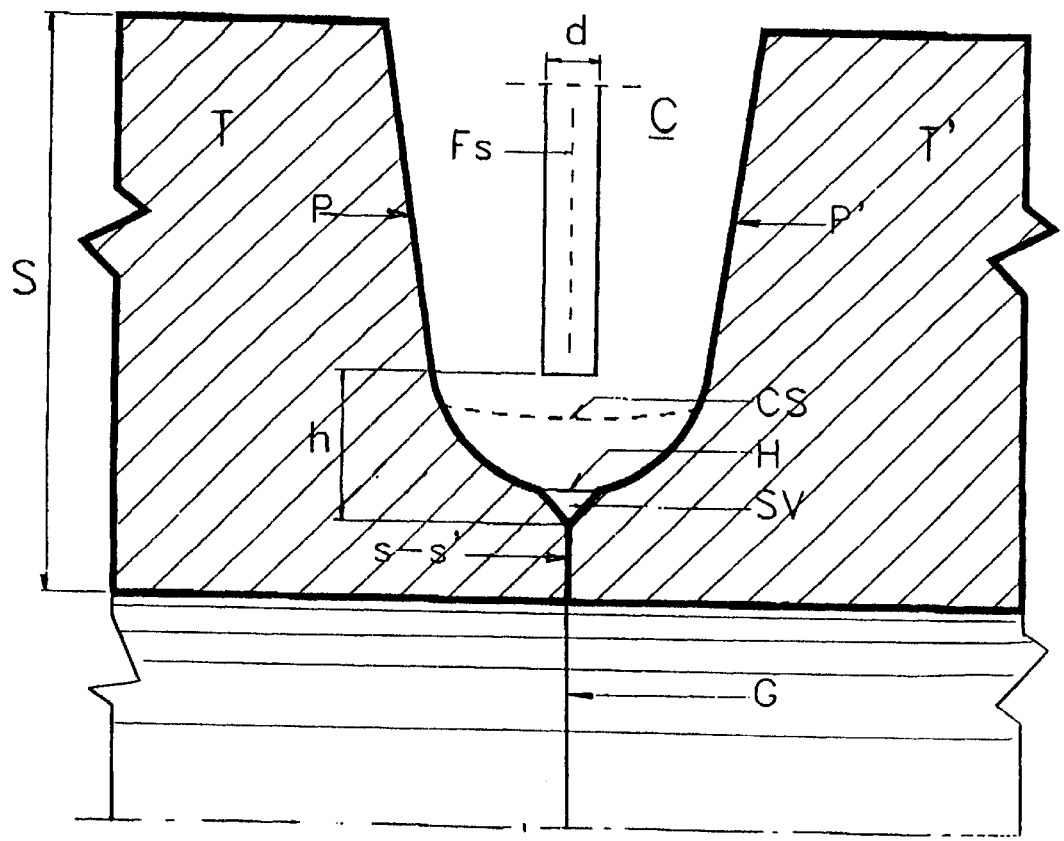
FIG. 2 is a partial sectional view, taken along an axial plane, which is similar to FIG. 1 and shows the juxtaposed pipe segments, the profile of the resulting welding bevel and the conditions for first-run welding.

The above specified microstructural welding by melting is then completed by the addition of a first-run welding bead which substantially has the profile of the entire bottom groove SV of the welding bevel and of part of the circular-arc profiles that blend said groove with the front walls p–p' of the welding bevel C; said bead is shown in dashed lines in FIG. 2 and is designated by CS.

Without altering the inventive concept, the details of execution and the embodiments may of course be altered extensively with respect to what has been described and illustrated by way of non-limitative example without thereby abandoning the scope of the invention.

The disclosures in Italian Patent Application No. T099A000258 from which this application claims priority are incorporated herein by reference.

What is claimed is:

1. A method for automated orbital welding of large-diameter pipes, with direct welding arc, comprising a first-run weld performed from outside the pipes without means for backing the weld pool, wherein said first-run weld is achieved with the following sequence of operating steps:

preparing a welding bevel (C) having a closed bottom by arranging, mutually adjacent, two pipe segments (T–T') which have symmetrical welding bevel half-profiles (p–p') with respective annular abutment surfaces (sp–sp'), the abutment surfaces forming, by being arranged in a mutually adjacent configuration with front contact, the closed bottom of the welding bevel (C), said closed bottom being delimited by a groove (SV) which has a maximum chord of preset width (H), performing the first welding run with one or more welding torches which are supplied with a welding wire the diameter "d" whereof being dependent on said maximum chord (H) of the bottom groove (SV) of the welding bevel (C); and maintaining, during said first welding run, the welding arc at a controlled length, by relating the distance (h) between the end of the welding wire and the vertex of the bottom groove (SV) to the width of said maximum chord (H) of the groove, in order to correspondingly limit to a preset value the penetration (x) of the melting temperature produced by the welding arc in the region adjacent to said opposite flat annular surfaces (sp–sp'); said temperature penetration producing a corresponding microstructural welding through a melting of the wall of said segments.

2. The method according to claim 1, wherein said annular abutment surfaces (sp–sp') have a thickness (s) which is 25–35% greater than said maximum chord (H) of the groove (SV) of the closed bottom of the welding bevel (C).

3. The method according to claim 2, wherein the diameter "d" of the wire (Fs) fed by the welding torch is 5–25% smaller than the length of the maximum chord (H) of the bottom groove (SV); where d=0.95÷0.75 H.

4. The method according to claim 3, wherein the length of the welding arc is such that said distance (h) between the end of the welding wire and the vertex of the bottom groove (SV) is chosen equal to 300–1000% of the length of said maximum chord (H) of the bottom groove; where h=3÷10 H.

5. The method according to claim 4, wherein the bottom groove (SV) of the welding bevel (C) is formed by juxtaposing straight and inclined portions (SR–SR') provided on said symmetrical welding bevel half-profiles (p–p').

6. The method according to claim 5, wherein said penetration (x) of the melting temperature (tf) is chosen, for both juxtaposed pipe segments, equal to 350–450% of the length of said maximum chord (H) of the bottom groove.

7. The method according to claim 6, wherein said microstructural welding of the pipe segments (T–T') obtained by melting the region adjacent to said annular abutment surfaces (sp–sp') is completed by application of a first-run welding bead (CS) having substantially a same cross-sectional profile as the entire bottom groove (SV) and as part of the circular-arc profiles that blend said groove to the front walls (P–P') of the welding bevel (C).

* * * * *